United States Patent [19]

Okuyama et al.

[11] 4,060,753
[45] Nov. 29, 1977

[54] CONTROL SYSTEM FOR COMMUTATORLESS MOTOR

[75] Inventors: Toshiaki Okuyama; Yuzuru Kubota, both of Ibaraki, Japan

[73] Assignee: Hitachi, Ltd., Japan

[21] Appl. No.: 702,897

[22] Filed: July 6, 1976

[30] Foreign Application Priority Data

July 4, 1975   Japan .................................. 50-81799

[51] Int. Cl.² ........................................... H02K 29/00
[52] U.S. Cl. .................................... 318/175; 318/254
[58] Field of Search ............... 318/165, 175, 174, 254, 318/227, 230, 231

[56] References Cited

U.S. PATENT DOCUMENTS

| | | | |
|---|---|---|---|
| 3,749,991 | 7/1973 | Kuniyoshi | 318/175 |
| 3,887,862 | 6/1975 | Hübner | 318/227 |

*Primary Examiner*—Herman Hohauser
*Attorney, Agent, or Firm*—Craig & Antonelli

[57] ABSTRACT

A control system for commutatorless motor comprising a synchronous motor having a multi-phase armature winding and field winding, a frequency converter for supplying a-c current of variable frequencies to the armature winding, a position detector for detecting the position signal based on the rotational position of the synchronous motor, a voltage setting circuit for producing a constant exciting reference signal for determining the magnitude of the terminal voltage of the synchronous motor, a first operational circuit for determining the magnitude of the nominal induced electromotive force representing the vector sum of the armature reaction drop and terminal voltage on the basis of the signal proportional to the armature current and constant exciting reference signal, a second operational circuit for obtaining the phase difference between the nominal induced electromotive force and terminal voltage obtained from the first operational circuit, a field control means for controlling, the field constant current given to the field winding according to the magnitude of the nominal induced electromotive force as obtained by the second operational circuit, a constant phase reference circuit for producing the current phase reference signal advanced in phase by the phase difference as obtained on the basis of the position signal as derived from the second operational circuit and current control means for controlling the armature current for adjusting the firing phase of the frequency converter on the basis of the current reference signal and current phase reference signal.

8 Claims, 14 Drawing Figures

4,060,753

CONTROL SYSTEM FOR COMMUTATORLESS MOTOR

BACKGROUND OF THE INVENTION

The present invention relates to control means for commutatorless motor for driving the synchronous motor by the thyristor frequency converter.

As is well known in the art, the commutatorless motor is a commutatorless variable speed motor consisting of a combination of a synchronous motor and frequency converter consisting of a thyristor for electrically controlling the synchronous motor. This commutatorless motor has features that its control range is very extensive and also that its maintenance and inspection are easy since it is free from commutator and brushes.

In this type of commutatorless motor, the power-factor varies with increase of load, and also the armature terminal voltage is changed. From this ground the capacity of the frequency converter and the synchronous motor are increased.

In order to compensate for the effect of the armature reaction, it is usual to adopt a method, in which a compensating winding for producing an electromotive force at right angles to the electromotive force of the field winding is provided and current of a magnitude corresponding to the armature current is caused to pass through the compensating winding. However, by providing the compensating winding the size of the field side of the motor is increased, and also a control circuit for controlling the current caused through the compensating winding is required. Therefore, increase of the size and cost of the commutatorless motor system is inevitable.

Meanwhile, with recent trend for adopting commutatorless motors in various fields in rollers and fans, it has been strongly desired to be able to simply compensating the armature reaction.

SUMMARY OF THE INVENTION

The main features of the invention are to obtain the magnitude of the nominal induced voltage which is the vector sum of the armature reaction drop and terminal voltage on the basis of the signal proportional to the armature current and constant exciting reference signal for determining the terminal voltage of the synchronous motor and to control the field current according to the magnitude of the nominal induced electromotive force and to control the phase of the armature current with respect to the nominal induced electromotive force according to the phase difference between the nominal induced electromotive force and terminal voltage.

Another feature of the invention is that a-c excitation is obtained according to the magnitude of the nominal induced electromotive force such that each field winding forms rotational field by using a synchronous motor having multiphase field winding.

The above and other features of the invention will become more apparent from the following description.

DETAILED DESCRIPTION OF THE INVENTION

Figure 1:
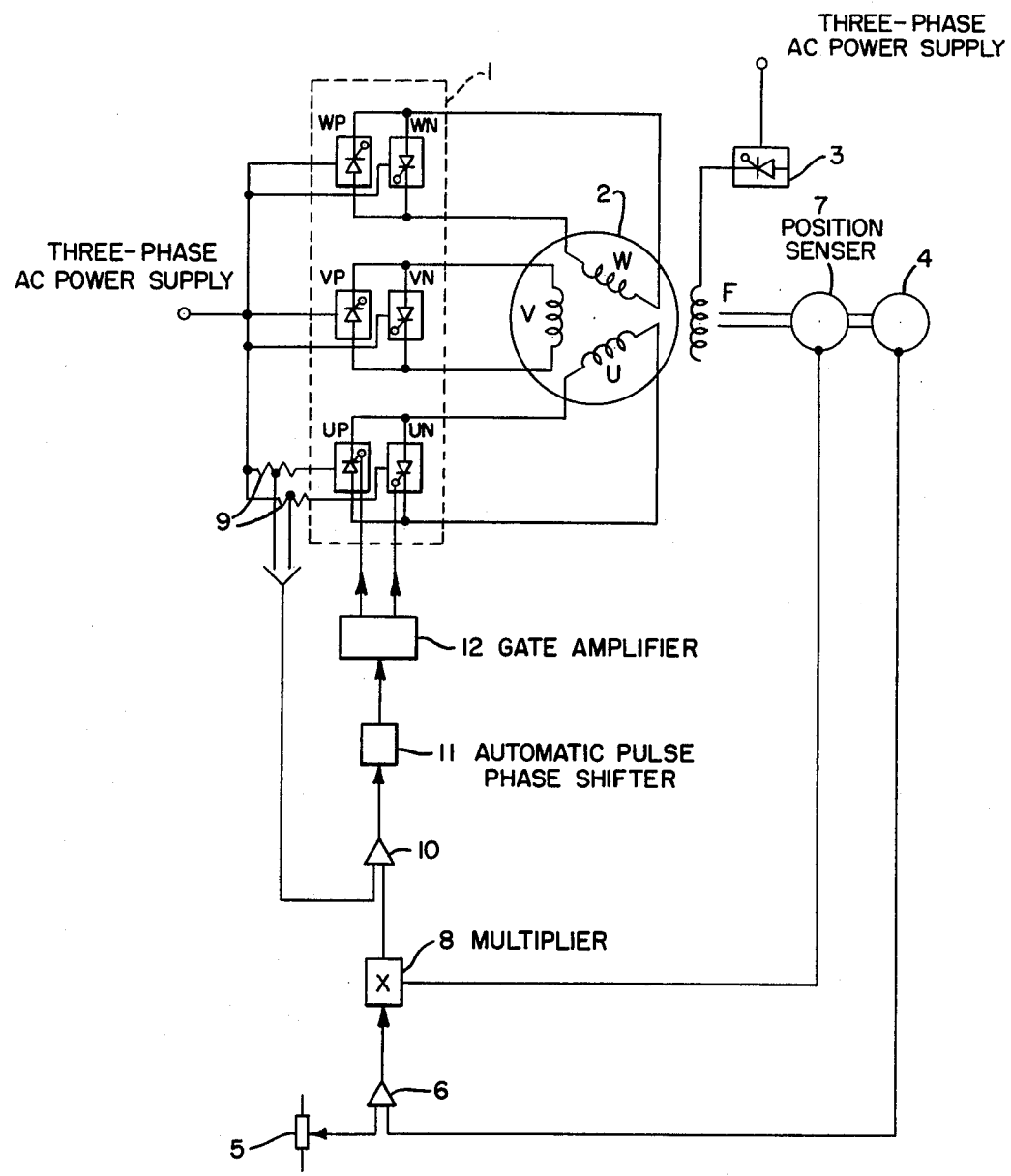
FIG. 1 is a schematic representation of an example of the prior-art system.

In FIG. 1, designated at 1 is a cyclo-converter receiving a-c input from a-c current source and producing three-phase output at variable frequencies, consisting of three sets of thyristor pure bridge circuits $U_p$, $U_n$, $V_p$, $V_n$, $W_p$ and $W_n$ in inverse parallel. Designated at 2 is a synchronous motor driven by cyclo-converter 1 and having three-phase armature windings, U, V and W and field winding F. Designated at 3 is a field control circuit for controlling the magnitude of the field current added to the field winding F, at 4 a tachometer generator for detecting the rotational speed of the synchronous motor 2, at 5 a speed reference circuit, at 6 a speed deviation amplifier for amplifying a superimposition of the output signal of the speed reference circuit 5, i.e., speed reference signal, and output signal of the speed generator 4, at 7 a position sensor producing three sinusoidal signals (three-phase signals) representing phases corresponding to the angular positions of the rotational shaft of the synchronous motor 2 and 120° out of phase from one another. The position sensor 7 may have, for instance, a construction comprising permanent magnets mounted on the rotor and three hole generators mounted on the surface of the stator facing the rotor. Designated at 8 is a multiplier for producing the product of one of the output signals of the position sensor 7 and the output signal of the speed difference amplifier circuit 6 to produce a current reference signal (a sinusoidal signal) for controlling the output current (U phase) of the cyclo-converter 1, at 9 a current detector for detecting the a-c input signals of the pure bridge circuits $U_p$, $U_n$ (referred to as thyristor circuits $U_p$ and $U_n$), at 10 a current difference amplifier circuit for amplifying the superimposition of current reference signal and output signal of current sensor 9, at 11 an automatic pulse phase shifter for controlling the firing phase of the thyristor circuits $U_p$ and $U_n$ according to the output signal of the current difference amplifier circuit 10, at 12 a gate output circuit for supplying alternate gate signals to the $U_p$ and $U_n$ inputs of the thyristor circuit in response to the designing of positive or negative of the output current of the thyristor circuits $U_p$ and $U_n$. The drawing shows only the control circuit with respect to the $U_p$ and $U_n$ of the thyristor circuit. Although there are the same control circuits for the other thyristor circuits $V_p$, $V_n$, $W_p$ and $W_n$, there are omitted.

In this construction, the position sensor 7 as mentioned earlier, has rotor provided with permanent magnets coupled to the rotational shaft of the synchronous motor 2 and stator detecting the field set up by the permanent magnets and a stator provided with hole generators generating the signals corresponding to the magnitude of the field. The permanent magnets are arranged on a rotor such that alternate N and S poles are formed in number equal to the quantities of the poles of the synchronous motor 2. The hole generators are attached on a stator in a spaced-apart relation at an electric angle of 120°. However, as is seen from FIG. 2a, sinusoidal position signals $S_u$ to $S_w$ of a constant amplitude are obtained from the position senser 7. The position signals $S_u$ and $S_w$ are signals related to the relative position (angle) of the field winding F and armature winding, U, V and W of the synchronous motor 2. In this case, the position sensor 7 is mounted such that the position signals $S_u$ and $S_w$ are in phase with the nominal induced voltage, as is seen from the relation between the position signal $S_u$ and nominal induced electromotive force $e_{ou}$ of the U phase. The armature voltages $e_u$ to $e_w$ of the synchronous motor 2 are leading the nominal induced electromotive force $\delta$ by the internal as shown in FIG. 2c.

A multiplier 8 produces the product of the output signal $S_u$ of the position sensor 7 and the output signal of the speed difference amplifier circuit 6 (i.e., current reference signal) to thereby produce the current pattern signal in phase with the position signal $S_u$ and with amplitude proportional to the current reference signal. The current pattern signal and output of the current detection signal are compared by the current difference amplifier circuit 10, and the difference signal is coupled to the automatic pulse phase shifter 11. The automatic pulse shifter 11 controls the firing phase according to the difference signal, and applied the gate signal from the gate output circuit 12 to the thyristor circuits $U_p$ and $U_n$.

In this way, the firing of the thyristor circuits $U_p$ and $U_n$ is controlled according to the operation of the parts 9 to 12. These operations are similar to the current control of the well-known stationary Reonald apparatus capable of current control in the forward and reverse directions, so they will not be discussed any further.

With this control, when applied to the thyristor circuits $V_p$ and $V_n$, the output currents iu, iv and iw of the cyclo-converter are controlled to the value corresponding to the current pattern signal as shown in FIG. 2b. In other words, the magnitude of the output current is controlled to the value proportional to the output signal of the speed difference amplifier circuit 6, i.e., current reference signal. Also, its phase is controlled to the same phase as the position signals $S_u$ to $S_w$ of the position sensor 7.

With this control, the motor 2 produces torque of a magnitude corresponding to the speed deviation, and the its rotational speed can be controlled in conformity to the speed reference signal.

In this prior-art system, however, there are the following disadvantages. Namely, power-factor is reduced with increase of the load (i.e., increase of the armature current). In addition, with increase of the magnitude of the armature terminal voltage the capacity of the cyclo-converter 1 and synchronous motor 2 are increased.

Figure 2:
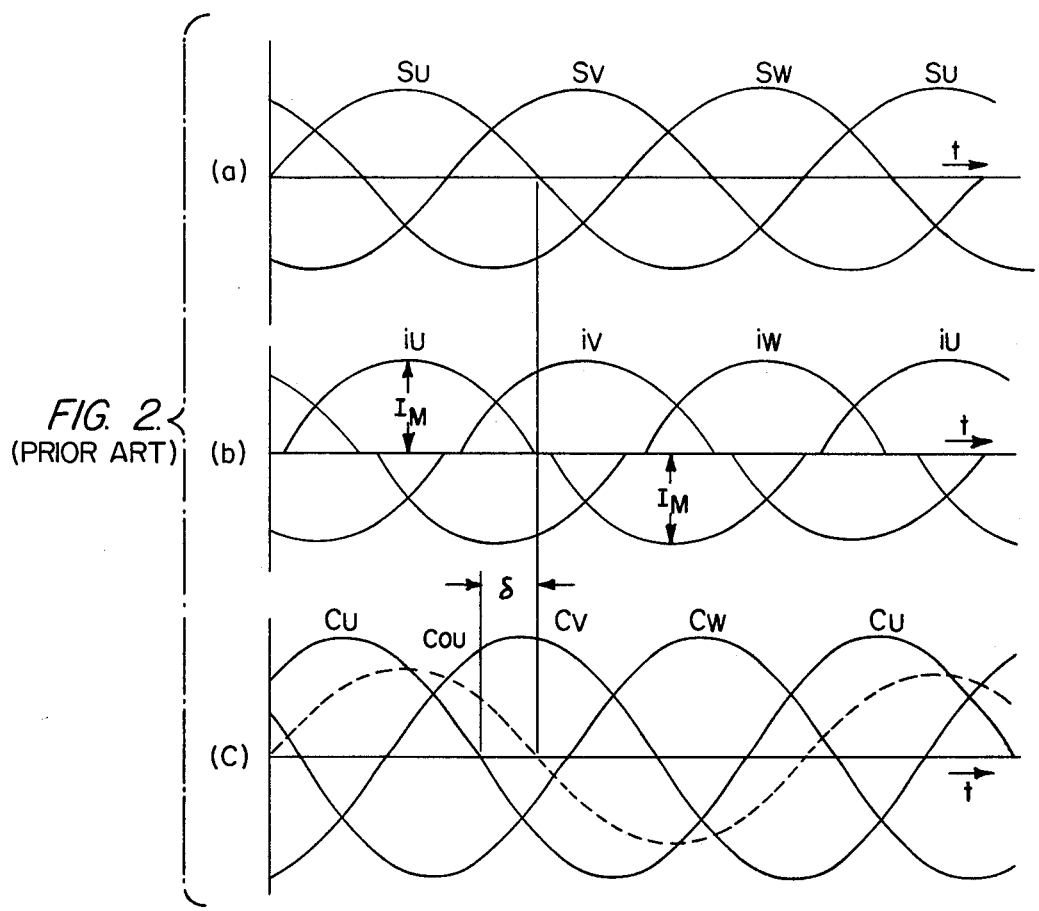
FIGS. 2 and 3 show waveform charts and vector diagram illustrating the operation of the system of FIG. 1.
Figure 3:
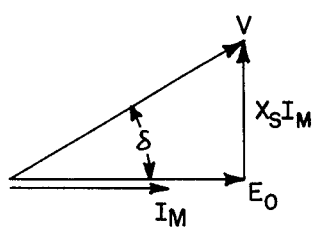

Normally, the output signal phase of the position sensor 7 is set such that the armature current (iu) and nominal induced electromotive force (eou) are as is shown in FIG. 2 in phase with each other. This is done so for providing amximum torque. As is seen from the vector diagram of FIG. 3, with the armature reaction $x_sI_M$ the phase of the terminal voltage V is advance by in terms of the electric angle with respect to the armature current IM. Also, the magnitude of the terminal voltage V becomes higher than the nominally induced electromotive force $E_0$. Therefore, reduction of power-factor and voltage increase result.

It has been known, as a method of solving the above drawback, to provide a compensating winding producing electromotive force normal to the electromotive force of the field winding and compensate the armature reaction by causing current of a magnitude corresponding to the armature current to pass through the compensating winding. However, a compensating winding of a complicated structure has to be provided in the motor. Also, doing so leads to increase of the field side of the motor and eventually to increase of the side of the motor. Further, a control circuit for controlling the current passed through the compensating winding is necessary. Therefore, increase of the size and cost of the system is inevitable.

The invention is predicated in the above aspects, and its object is to provide a control system for commutatorless motor, which permits to prevent current concentration in a particular thyristor constituting the frequency converter during the afore-mentioned compensation for armature reaction.

The above and other objects of the invention will become more apparent from the following description.

Now, an embodiment of the invention will be described with reference to FIG. 4.

Figure 4:
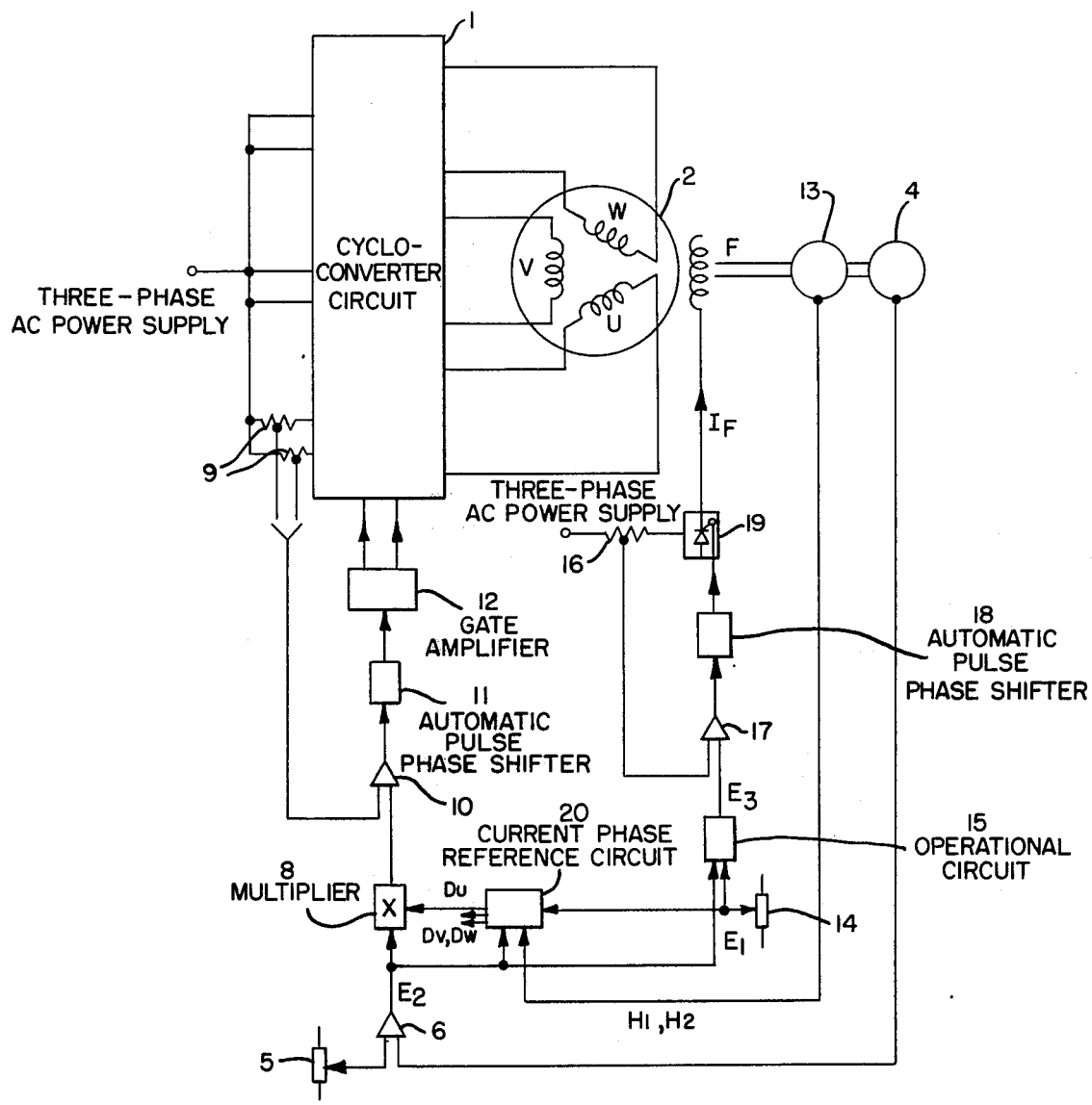
FIG. 4 is a schematic view showing an embodiment of the invention.

In FIG. 4, parts designated by like reference numerals as in FIG. 1 are like parts and are not described in further detail. Designated at 13 is a position sensor providing two sinusoidal waves (two phase signals) at respective phases corresponding to the rotational positions of the motor 2 and 90 degrees out of phase with each other. The position sensor 13 is similar to the position sensor 7 in FIG. 1 and its two hole generators are mounted on the stator at a spacing corresponding to the electric angle of 90°. The position sensor is arranged to produce two phase position signals for the sake of simplifying the operations to be described hereinafter. It is possible to use a position sensor generating three phase position signals. Designated at 14 is a constant exciting current reference circuit for producing reference signal $E_1$ (hereinafter referred to as constant exciting current reference signal) of a constant exciting current portion of the field current $I_F$ given to the field winding F. The constant exciting current reference signal $E_1$ serves to set, the nominal induced electromotive force at the non-load time, that is, the magnitude of the terminal voltage. Designated at 15 is an operational circuit receiving the constant exciting reference signal $E_1$ and the output signal of the speed deviation amplifier 6, that is, current reference signal $E_2$ and producing an operational signal $E_3$ to be described layer. Designated at 16 is a current detector for detecting the magnitude of the a-c input current of the field control thyristor 19 (hereinafter referred to as thyristor circuit). Designated at 17 is a current deviation amplifier for amplifying the superimposition of the output signals of the operational circuit 15 and current detector 16. Designated at 18 is an automatic pulse phase shifter for controlling the firing phase of the thyristor circuit 19 according to the output signal of the current difference amplifier circuit 17.

Designated at 19 is a thyristor circuit supplying field current $I_F$ to the field winding F. Designated at 20 is a current phase reference circuit for obtaining three phase sinusoidal signals (hereinafter referred to as current phase reference signal) output signal of the position detector 13 and constant exciting reference signal $E_1$ and current reference signal $E_2$ according to a relation to be described hereinafter.

Figure 5:
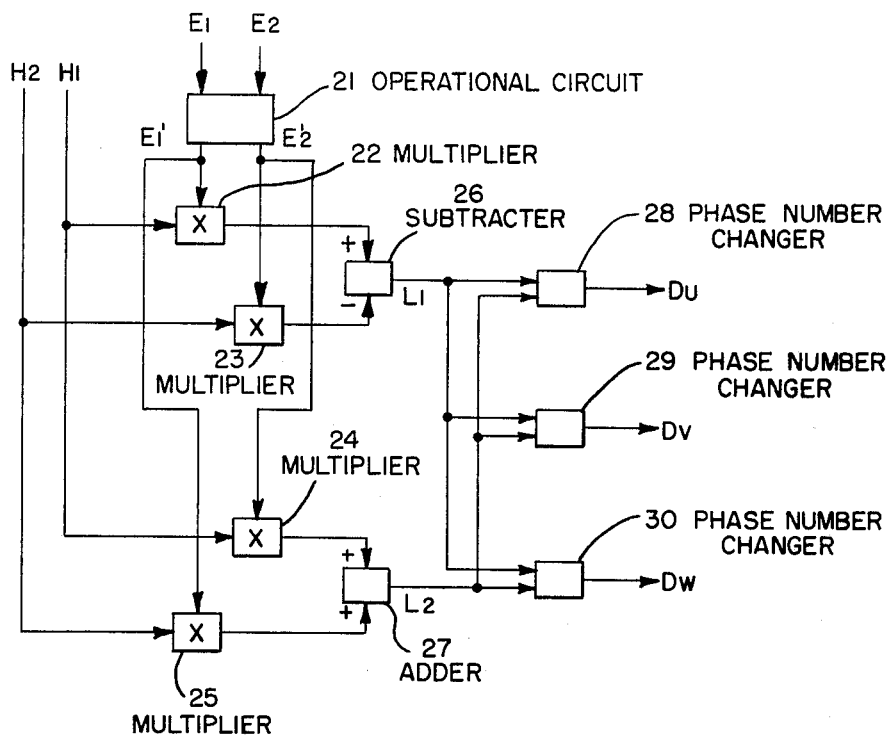
FIG. 5 is a schematic view illustrating the detailed construction of the current phase reference circuit.

FIG. 5 is a view showing the construction of the current phase reference circuit 20.

In FIG. 5, designated at 21 is an operational circuit receiving the constant exciting reference signal $E_1$ and current reference signal $E_2$ and producing signals $E'_1$ and $E'_2$ to be described hereinafter. It consists of a combination of multipliers, dividers and square root circuits. Designated at 22 to 25 are multipliers for producing the product of the output signals $E'_1$ and $E'_2$ of the operational circuit 21. Designated at 26 is a subtractor for taking the difference between the output signals 22 and 23 of the shown polarity, at 27 an adder for taking the sum of the output signals of the multipliers 24 and 25. Designated at 28 to 30 are phase number changer for adding the output signals of the subtractor 26 and adder 27 in predetermined proportions and producing three phase sinusoidal signals. Although the phase number changer 28 to 30 are mere adders, they are referred to as phase number changer since they convert two-phase signal into three-phase signal.

Figure 6:
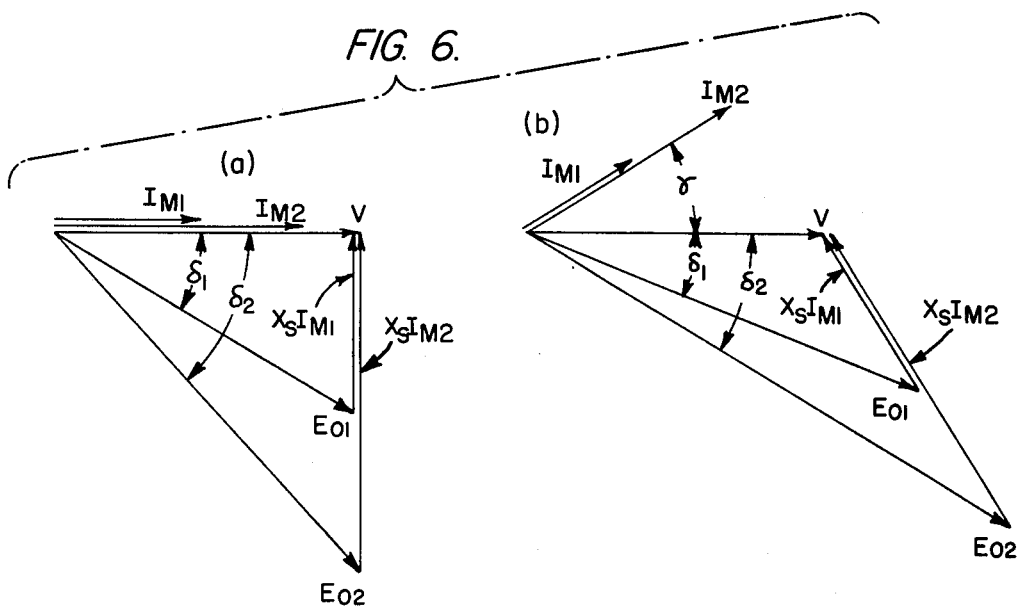
FIG. 6 is a vector diagram illustrating the operational principles underlying the invention.

Before describing the operation of the construction of the above embodiment according to the invention, fundamental principles underlying the invention will now be illustrated by using the vector diagrams as shown in FIG. 6.

FIG. 6 shows vector diagrams representing relationships among nominal induced electromotive force $E_0$, armature reaction drop $x_sI_M$, terminal voltage V and inner phase angle. FIG. 6a represents the case with motor power-factor of 1.0, and FIG. 6b the case of power-factor of 1.

As is apparent from is vector diagram, with a change of the armature current $I_M$ from $I_{M1}$ to $I_{M2}$ the armature reaction drop $x_sI_M$ also changes from $x_sI_{M1}$ to $x_sI_{M2}$. With this armature reaction variation of terminal voltage and variation of power-factor result. Thus, by controlling the magnitude of the nominal induced electromotive force (proportional to the field current) and the phase of the armature current the aforementioned variation can be repressed. Thus, when the armature current changes from $I_{M1}$ to $I_{M2}$ in case of FIG. 6a, the nominal induce electromotive force is changed from $E_{O1}$ to $E_{O2}$. Also, by changing the phase difference of the armature current for the induced electromotive force from $\delta_1$ to $\delta_2$ the magnitude of the terminal voltage and power-factor can be maintained constant. Further, in the case of FIG. 6b the nominal induced electromotive force is changed from $E_{O1}$ to $E_{O2}$, and the nominal induced electromotive force is changed from $E_{O1}$ to $E_{O2}$, while the phase difference with respect to the nominal induced electromotive force is changed from $\delta_1 + \gamma$ ($\gamma$ being power-factor angle) to $\delta_2 + \gamma$. As a result, the magnitude of the terminal voltage and power-factor can be maintained constant irrespective of the magnitude of the armature current. The foregoing is the fundamental principle underlying the invention.

Specific control means will now be described on the basis of operation of the system of FIGS. 4 and 5 in case when the power-factor is 1.

The operational circuit 15 receives constant exciting reference signal $E_1$ and current reference signal $E_2$ and produces operational signal $E_8$ expressed as $$E_3 = \sqrt{E_1^2 + E_2^2} \tag{1}$$

The constant exciting current reference signal $E_1$ sets the terminal voltage V. Further, since synchronous reactance $x_s$ controls the terminal voltage (air gal flux) to be constant, it is constant irrespective of whether the system is under load or non-load. Consequently, the current reference signal $E_2$ is proportional to the armature reaction $x_sI_n$. Thus, the output signal $E_3$ of the operational circuit 15 is proportional to the nominal induced electromotive force $E_0$ shown in FIG. 6.

Further, the operational circuit 15 can be constructed with a function generator with input-output relation represented by a curve of the second-order function.

The output signal $E_3$ of the operational circuit 15 is a field current specifying signal specifying the magnitude of the field current $I_F$, and it is added to a current difference amplifier circuit 17. The current difference amplifier circuit 17 compares the field current specifying signal $E_3$ and output signal of the current detector 16, and its deviation signal is added to an automatic pulse phase shifter 18. The automatic pulse phase shifter 18 controls the firing phase according to the deviation signal and gives a gate signal to a thyristor circuit 19. The thyristor circuit 19 is controlled in a manner similar to the current control of the well-known stationary Reonald system. As a result, the field-current $I_F$ is controlled in proportion to signal $E_3$ as shown in equation.

$$I_F = KE_3 \tag{2}$$

where $k$ is a proportionality constant.

Considering now the voltage induced in the armature windings U, V and W, the field current $I_F$ sets up flux linking with the armature winding, with the number of flux linkages changing with the rotation of the rotor. Thus, a U phase nominal induced electromotive force eou is induced in the U phase armature winding. The V and W phase voltages differs from the U phase signal only in phase of respective 120°, so they are not described any further.

$$eou = -\omega r.M.I_F \sin(\omega r t + \phi_1) \tag{3}$$

where M is the maximum mutual inductance between field winding and armature winding, $\omega r$ is the angular frequency of the induced voltage, namely $\omega r = 2\pi p N_s$, with p being number of pole pairs and $N_s$ being r.p.s., and $\phi_1$ is an electric angle made by field winding F and armature winding U at instant $1 = 0$.

On the other hand, the armature current is controlled in the following way. From the position sensor 13 there are obtained two phase signals $H_1$ and $H_2$ corresponding to the angular positions of the rotor (field) as shown by equations below. The amplitude value of the signal is not discussed since it is not significant in this instant. Further, other signals are similarly omitted when they are unnecessary.

$$H_1 = \cos(\omega r t + \phi_2) \tag{4}$$

$$H_2 = \sin(\omega r t + \phi_2) \tag{5}$$

where $\phi_2$ is the signal phase at instant $t = 0$.

The current phase reference circuit 20 receives these signals $H_1$ and $H_2$ and signals $E_1$ and $E_2$ for the following operation.

The operational circuit 21 produces signals $E_1$ and $E_2$ from signals $E'_1$ and $E'_2$ as expressed as $$E'_1 = E_1/\sqrt{E_1^2 + E_2^2} \tag{6}$$

$$E'_2 = E_2/\sqrt{E_1^2 + E_2^2} \tag{7}$$

The signal $E'_1$ corresponds to the ratio between terminal voltage V and nominal induced electromotive force $E_0$ and is proportional to cos $\delta$, and the signal $E'_2$ corresponds to the ratio between armature reaction $x_sI_M$ and nominal induced electromotive force and is proportional to sin $\delta$.

Then, multipliers 22 and 23 produces products of $H_1$ and $E'_1$ and $H_2$ and $E'_1$ respectively, and the resultant two signals are subtracted one from another by a subtractor 26 to obtain signal $L_1$ given as $$L_1 = \cos(\omega rt + \phi_2 + \delta) \tag{8}$$

where $\delta = \tan^{-1}(E_2/E_1)$

Similarly, products of signals $H_1$ and $E'_2$ and also $H_2$ and $E'_1$ are produced by respective multipliers 24 and 25, and the two signals are added together by adder 27 to obtain $L_2$ given as $$L_2 = \sin(\omega rt + \omega_2 + \delta) \tag{9}$$

These signals $L_1$ and $L_2$ are led to phase number changer 27 to 29, and the following three signals (current phase reference signals) $D_u$, $D_v$ and $D_w$ are obtained through operations expressed as $$D_u = -L_2 = -\sin(\omega rt + \phi_2 + \delta) \tag{10}$$

$$D_v = (\sqrt{3}/2)L_1 + \tfrac{1}{2}L_2 = -\sin(\omega rt + \phi_2 + \delta - 120°) \tag{11}$$

and $$D_w = -(\sqrt{3}/2)L_1 + \tfrac{1}{2}L_2 = -\sin(\omega rt + \phi_2 + \delta + 120°) \tag{12}$$

As is apparent from equations 10 to 12, the current phase reference signals $D_u$ to $D_w$ are sinusoidal signals equal in frequency to voltage $eo$ and 120° out of phase with one another.

The multiplier 8 produces the product of the current phase reference signal $D_u$ thus obtained and current reference signal $E_2$ to obtain armature current pattern signal determining and magnitude and phase of the U phase armature current $iu$. As a result, the armature current $iu$ is controlled to the same phase as the armature current pattern signal like the case of FIG. 1. Its magnitude corresponds to current reference signal $E_2$.

The armature current $iu$ is expressed as $$iu = -Im \sin(\omega rt + \phi_2 + \delta) \tag{13}$$

where $I_m$ is the amplitude of the current.

With respect to the other currents $iv$ and $iw$, they are similarly controlled according to an armature current pattern signal obtained by multiplying the current reference signal $E_2$ and current phase reference signal $D_v$ and $D_w$, and they are different from $iu$ only in phase by 120 degrees respectively so they are described no further.

As is apparent from equation 13, armature current $iu$ is advanced in phase by $\delta$ with respect to the position signal $H_2$ as shown in equation 5. If the position sensor 13 is provided such that the position signal $H_2$ is in phase with the nominal induced electromotive force, that is if $\phi_1 = \phi_2$, the armature current $I_M$ and terminal voltage V are in phase with each other. Thus, the power-factor can be maintained at 1,0.

As a result of the armature current in this way, the motor produces torque $\tau$ given as $$\tau = (3/2) PMI_m \cdot I_F \cos(\phi_2 - \phi_1 + \delta) \tag{14}$$

The value $(\phi_2 - \phi_1)$ is suitably set by appropriately adjusting the phase of the output signal of the position sensor 13 through adjustment of the positional relation between hole generator and permanent magnet in the position detector 13. When $\phi_2 = \phi_1$, the torque is given as $$\tau = (3/2) PMI_m \cdot I_F \cos \delta \tag{15}$$

$I_F \cos \delta$ in equation 15 is, from the relations of equations 1 and 2 and $\delta = \tan^{-1}(E_2/E_1)$ $$I_F \cos \delta = KE_1 \tag{16}$$

Thus, the torque $\tau$ is determined solely from the magnitude $I_m$ of the armature current (corresponding to current reference signal) and the magnitude of the constant exciting reference signal $E_1$.

Concerning the armature voltage now, with armature currents $iu$ to $iw$ armature reaction takes place, so that the terminal voltage V is reduced from the nominal induced electromotive force $E_0$ by the armature reaction drop $x_sI_M$. Hence, U phase terminal voltage $eu$ (instantaneous value) is $$eu = eou - x_sI_M\cos(\omega rt + \phi_1 + \delta) \tag{17}$$

$$= -\omega rMI_F\cos\delta \sin(\omega rt + \phi + \delta)$$

$$+ (\omega rMI_F\sin\delta - x_sI_M)\cos(\omega rt + \phi_1 + \delta)$$

$I_F \sin \delta$ in equation 17 is, from the relations of equations 1 and 2 and $\delta = \tan^{-1}(E_2/E_1)$, $$I_F \sin \delta = KE_2 \tag{18}$$

Consequently, since it is proportional to the amplitude $I_m$ of the armature current, it can be adjusted to $$I_F \sin \delta / I_m = x_s/\omega rM \tag{19}$$

This adjustment can be done, for instance, by controlling the input impedance of the current deviation amplifier 10. With third adjustment the terminal voltage $eu$ $$eu = -\omega rMI_F \cos\delta \sin(\omega rt + \phi_1 + \delta) \tag{20}$$

$I_F \cos \delta$ in equation 20 is equal to $kE_1$ as in equation 16 and constant. In the long run, the magnitude of the terminal voltage $eu$ is not affected by the armature current. Its magnitude is determined by the constant exciting current reference signal $E_1$ and is not changed with the armature current, and the terminal voltage is always in phase with the armature current (with power-factor of 1.0) irrespective of the magnitude of the armature current as is seen from the relations of equations 13 and 20. This means that it is possible to prevent the reduction of the power-factor and increase of the terminal voltage with increase of the load.

While the control is made in the above way, the following is apparent.

1. The magnitude of the torque is suitably controlled by appropriately controlling the magnitude $I_m$ of the armature current. Thus, by controlling the armature current according to the output signal of the speed deviation amplifier 6 (current reference signal) the rotational speed of the motor can be controlled according to the speed reference.

2. The magnitude of the armature terminal voltage can be controlled irrespective of the armature current, and the terminal voltage and armature current can always be held in phase with each other. Thus, it is possible to prevent the reduction of the power-factor accompanying the increase of the load and increase of the terminal voltage. In other words, it is possible to compensate for the armature reaction without providing any compensating winding. As a result, the capacity of the cyclo-converter 1 and synchronous motor 2 can be reduced.

Figure 7:
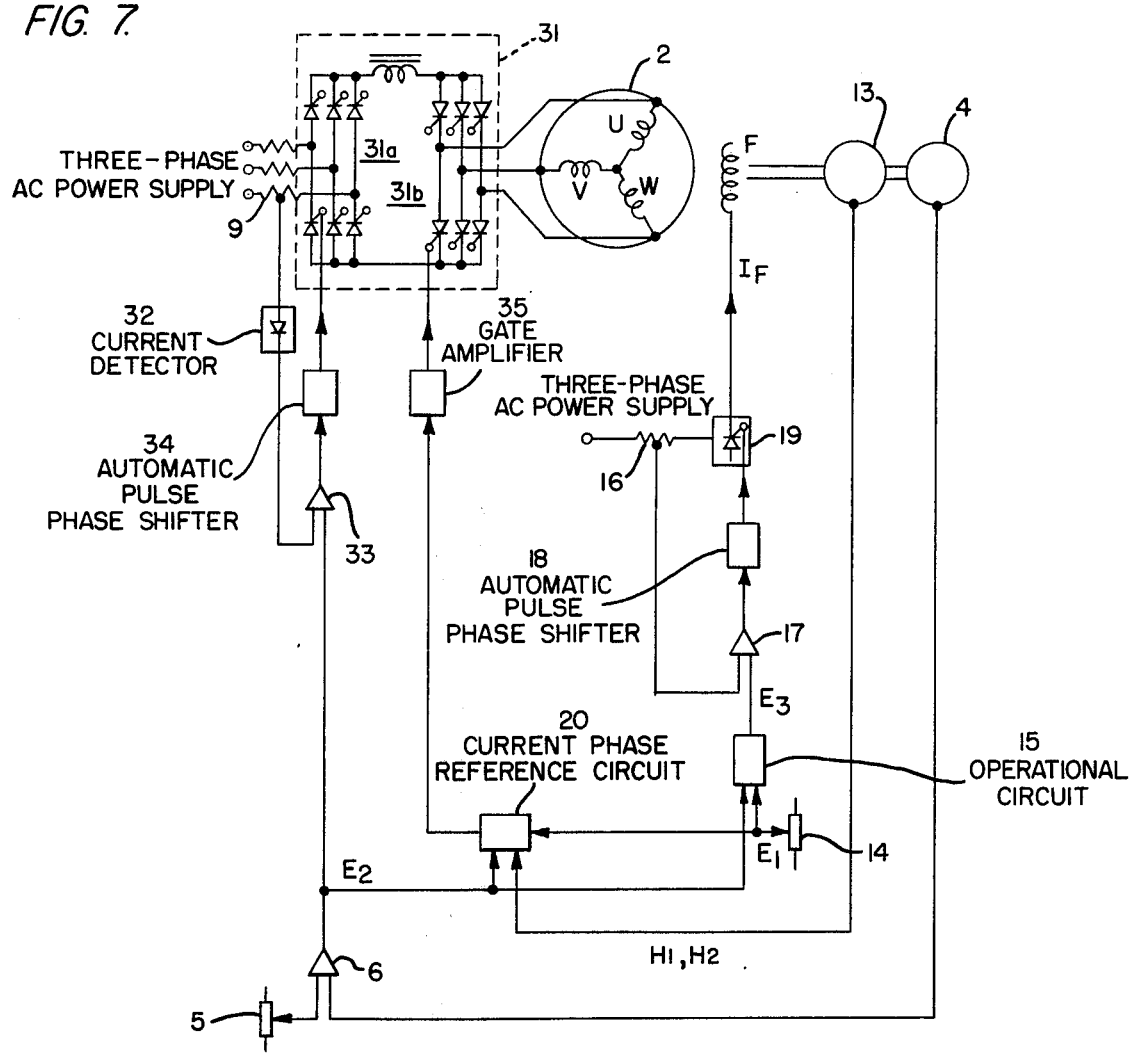
FIG. 7 is a schematic circuit diagram showing an embodiment of the invention.

FIG. 7 shows the construction of another embodiment of the invention.

FIG. 7 is a schematic circuit diagram showing another embodiment of the present invention, wherein the parts and components designated by like reference numerals as those shown in FIG. 4 are like parts and components and will not further described in more detail. FIG. 7 indicates the application of the present invention to the embodiment of so-called commutatorless motor of DC link type, in which a thyristor frequency converter is composed of rectifier circuits 31a for converting AC voltage to DC voltage and inverter circuits 31b for converting the DC voltage to AC voltage.

Even such commutatorless motor of DC link type varies in its power factor and armature voltage of the motor in response to the variations of load applied thereto, but these changes can be prevented by adopting the present invention therefor.

In FIG. 7, reference numeral 31 illustrates a thyristor frequency converter consisting of rectifier circuits 31a for converting AC voltage to DC voltage and inverter circuits 31b for converting the DC voltage to AC voltage, numeral 32 a current detector for detecting AC input current of the rectifier circuits 31a, 33 a current difference amplifier circuit for amplifying the superimposition of the current reference $E_2$ and output signal (DC signal) of the current detector 32, 34 an automatic pulse phase shifter for controlling the firing phase of the rectifier circuits 31a in response to the output signal of the current difference amplifier circuit 33, and 35 a gate amplifier for producing a gate signal of the inverter circuits 31b having the phase relation as will hereinafter be described in more detail from the output signal of the current phase reference circuit 20.

The operation of the circuit configuration thus constructed as described above will be then described with reference to FIG. 8, which shows a waveform chart illustrating the operation of the circuit shown in FIG. 7. The input current of the rectifier circuits 31a and armature current of the synchronous motor 2 being proportional to the input current of the rectifier circuits 31a are controlled to the values responsive to the current reference $E_2$ by the operations of the current detector 32, current difference amplifier circuit 33, automatic pulse phase shifter 34 and rectifier circuits 31a. These operations have been well known and will be therefore omitted in further more detail description.

Figure 8:
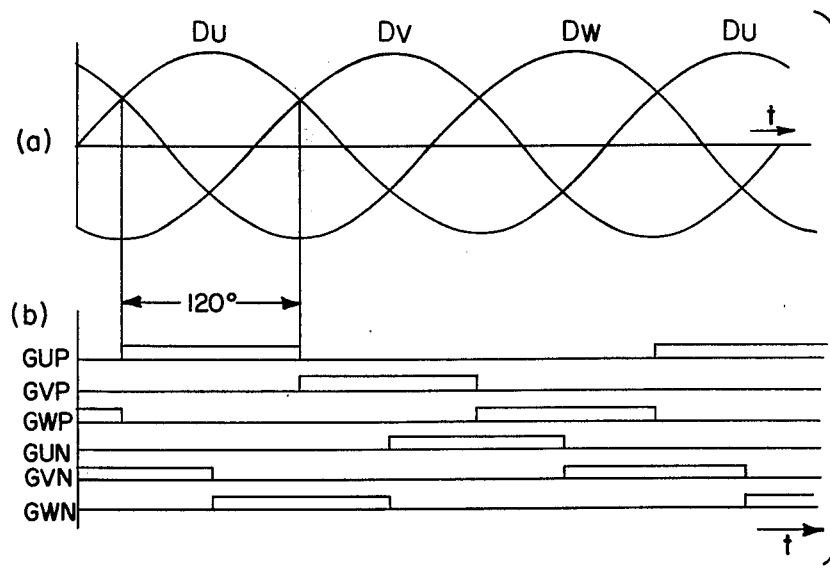
FIG. 8 is a waveform chart illustrating the operation of the system of FIG. 7.

On the other hand, the gate amplifier 35 receives current phase references $Du$ to $Dw$ of the current phase reference circuit 20 as an input and produces a gate signal (FIG. 8b) of the inverter circuits 31b being in phase relation as indicated in FIG. 8 to the current phase references $Du$ to $Dw$. The thyristors of the inverter circuits 31b are energized in accordance with this gate signal. Finally, the armature current of the synchronous motor 2 flows in phase with the current phase references $Du$ to $Dw$.

Therefore, it should be appreciated clearly that since the amplitudes and phases of the field current and armature current of the synchronous motor are similarly controlled to those of the embodiment shown in FIG. 4 even in the embodiment shown in FIG. 7, the compensation of the armature reaction of the motor can be performed in the same manner as that of the previous embodiment.

It has heretofore been described in the previous embodiments that the power factor of the synchronous motor was 1.0, but if a frequency converter commutates by means of the counter electromotive force of the motor, so-called a separately-excited converter, it is necessary to set up the power factor less than 1.0. The commutation of the electric motor by the counter electromotive force is mostly adopted for the commutatorless motor of DC link type as shown in FIG. 7 in which the inverter circuits do not have a forced commutation circuit. Accordingly, although this will be further described based on the embodiment shown in FIG. 7 in more detail, there are differences from the embodiment shown in FIG. 9 that a current phase reference circuit 20 is formed as shown in FIG. 9, a position detector 13 produces a position signal of square wave, and a gate amplifier 35 receives a square wave signal as an input and produces a gate signal.

Figure 9:
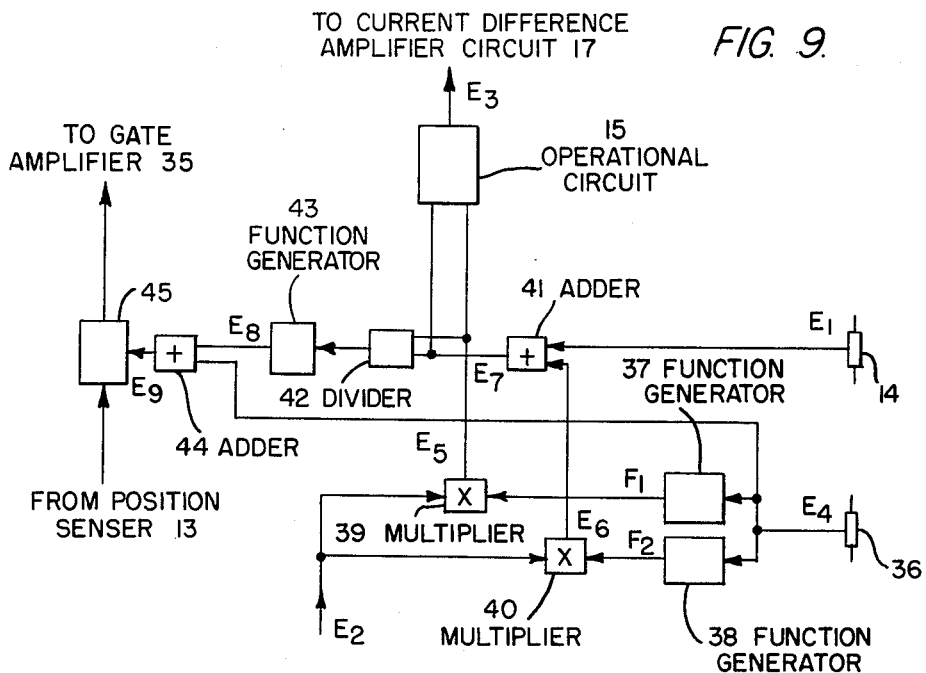
FIG. 9 is a fragmentary schematic diagram of the circuit of another embodiment of the invention.

In FIG. 9, which shows a fragmentary schematic diagram of the circuit of another embodiment of the present invention, reference numeral 36 indicates a power factor angle reference circuit for producing a reference $E_4$ of power factor angle $\gamma$, numeral 37 a function generator for generating an output $F_1$ from the reference $E_4$ of input having the relation as shown in FIG. 10a, 38 a function generator for generating an output $F_2$ from the reference $E_4$ of input having the relation as shown in FIG. 10b, 39 a multiplier for multiplying the output signal $F_1$ of the function generator 37 by the current reference, 40 a multiplier for multiplying the output signal $F_2$ of the function generator 38 by the current reference $E_2$, 41 an adder for adding the output signal of the multiplier 40 to the constant exciting current reference $E_1$, 42 a divider for dividing the output of the multiplier 39 by the output of the adder 41, 43 a function generator for generating the ouput $E_8$ from the input of the reference $E_5/E_7$ as shown in FIG. 10c, 44 an adder for adding the output signal of the function generator 43 to the power factor angle reference $E_4$, and 45 a phase shifter for receiving the position signal (square wave signal) of the position sensor 13 to produce a square wave signal which phase is shifted by the amount proportional to the output signal of the adder 44 from the input signal.

The operation of the circuit configuration thus constructed will now be hereinafter described in more detail. The multipliers 39 and 40 receive the current reference $E_2$ for both and signals $F_1$ and $F_2$, respectively, and produces the output signals $E_5$ and $E_6$, respectively represented by the following formulae:

$$E_5 = E_2 \cos E_4 = E_2 \cos \gamma \qquad (21)$$

$$E_6 = E_2 \sin E_4 = E_2 \sin \gamma \qquad (22)$$

Figure 11:
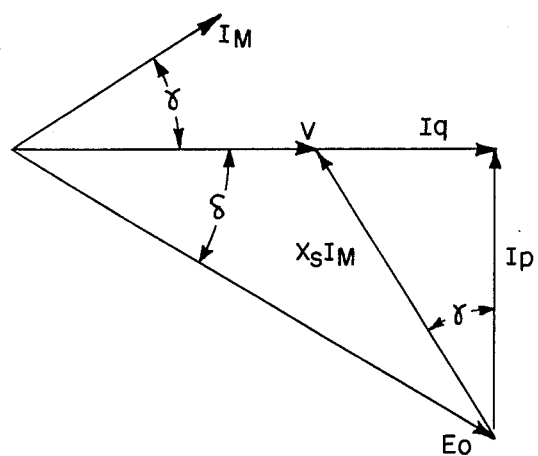
FIG. 11 is a vector diagram illustrating the operation of the system of FIG. 10.

The signal $E_5$ corresponds to a vector $Iq$ of a vector diagram shown in FIG. 11 and the signal $E_6$ corresponds to a vector Ip in FIG. 11. The constant exciting current reference $E_1$ is added to the signal $E_6$ by the adder 41 for producing the sum of $E_7$ which is represented by the following formula:

$$E_7 = E_1 + E_2 \sin \gamma \tag{23}$$

Figure 10:
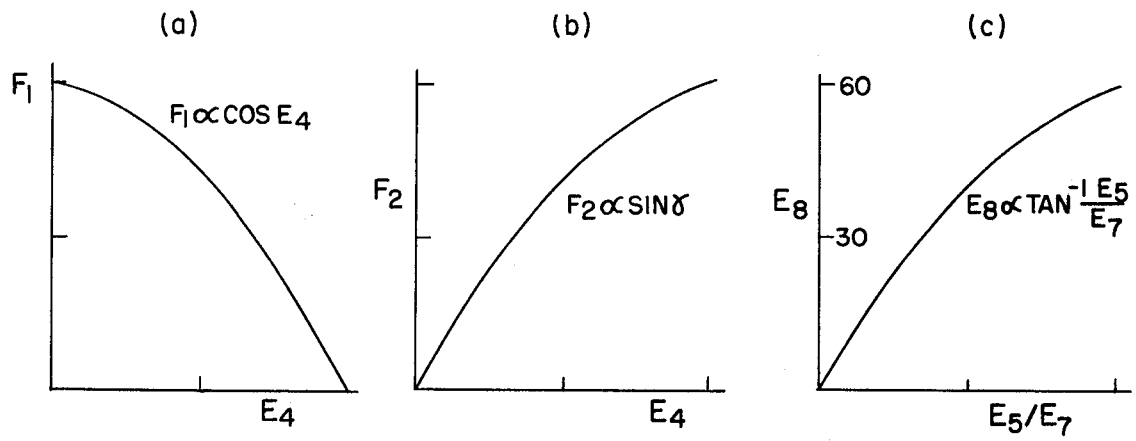
FIG. 10 is an input-output characteristic of a function generator according to the invention.

The signal $E_7$ is proportional to the amplitude of the vector sum of the terminal voltage V and vector Ip in FIG. 10. The operational circuit 15 receives the signals $E_5$ and $E_7$ and produces an operational signal $E_3$ as shown in the following formula:

$$E_3 = \sqrt{E_5^2 + E_7^2} \tag{24}$$

The signal $E_3$ shown in the aforementioned equation (24), as clear from the vector diagram shown in FIG. 11, is proportional to the nominal induced electromotive force $E_0$. Consequently, the field current $I_F$ is so controlled as to be proportional to the amplitude of the nominal induced electromotive force $E_0$, as expressed by the aforementioned equation (2).

On the other hand, the phase of the armature current is controlled as follows:

The reference $E_5/E_7$ is at first obtained by the divider 42 by applying the references $E_5$ and $E_7$ to the divider 42 to divide $E_5$ by $E_7$, the result thus obtained $E_5/E_7$ is then added to the function generator 43 for producing the signal $E_8$ proportional to the internal phase difference angle $\delta$ according to the characteristic as expressed in FIG. 10c, which angle $\delta$ can be obtained by the following equation:

$$\delta = \tan^{-1}(E_5/E_7) \tag{25}$$

This internal phase difference angle signal $E_8$ is added to the power factor angle reference $E_4$ by the adder 44 for producing the sum of phase shifting signal $E_9$, which is applied to the phase shifter 45. The phase shifting signal $E_9$ is obtained as follows:

$$E_9 = E_4 + E_8 = \delta - \gamma \tag{26}$$

Figure 12:
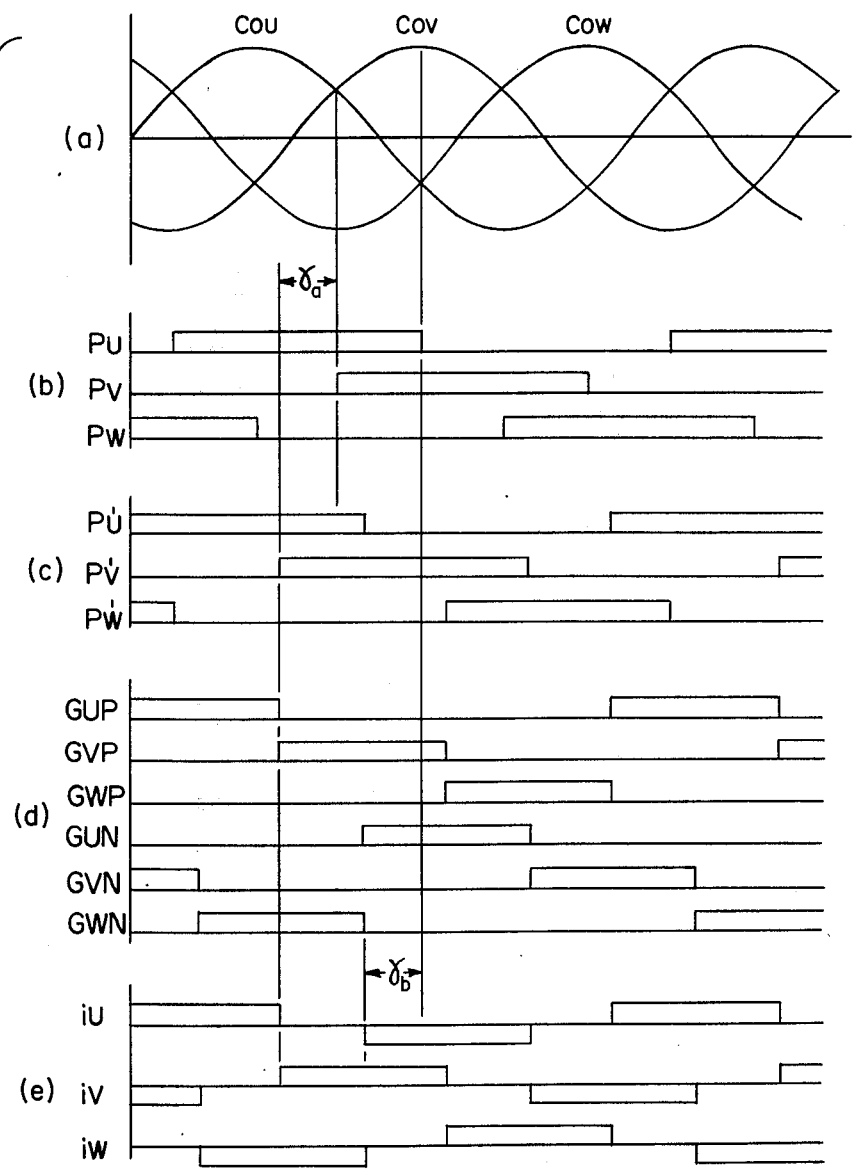
FIG. 12 is a waveform chart illustrating the same.

FIG. 12 is a waveform chart for the explanatory purpose of the operations of the position senser 13, phase shifter 45 and gate amplifier 35. FIG. 12a shows the phase of the nominal induced electromotive force $e_0$ of the synchronous motor 2. The position senser 13 produces three square wave signals $P_U$, $P_V$, $P_W$ having the phase relations with respect to the nominal induced electromotive force $e_0$ as shown in FIG. 12b. The phase shafter 45 shifts the phase amount of the position signals $P_U$ to $P_W$ to those proportional to the phase shifting signal $E_9$ for producing the output signals $P_U'$ to $P_W'$, respectively as shown in FIG. 12c. The gate amplifier 35 receives the signal of the phase shifter 45 and produces gate signals $G_{UP}$ to $G_{WN}$ of the inverter circuits 31b having the phase relation as shown in FIG. 12d. Since the thyristors in the inverter circuits 31b are energized according to this gate signals, the armature currents $i_U$ to $i_W$ of the synchronous motor 2 finally flow in the phases as expressed in FIG. 12e. That is, the phase difference between the armature current (base wave) and the nominal induced electromotive force $e_0$ is controlled to $\delta_0$.

There will now be hereinafter described the reason that the terminal voltage V and electric motor power factor can be maintained constant without fluctuations even if the armature current of the synchronous motor varies by controlling the amplitude of the field current $I_F$ and phase of the armature current of the motor as described above:

From the result that the field current $I_F$ of the motor is controlled by the field current reference $E_3$ of the equation (24), the nominal induced electromotive force $e_{OU}$ represented by the following equation is induced at the armature U:

$$e_{OU} = -\omega r \, M \cdot I_F \sin(\omega r t) \tag{27}$$

where $t = 0$ is selected when an angle of U phase between the field and armature of the motor is zero in the equation (27).

On the other hand, as the armature current $i_U$ is controlled in accordance with the phase relation as previously described, it can be expressed as follows:

$$i_U = -Im \sin(\omega r t + \gamma_0) \tag{28}$$

where $Im$ represents the amplitude of the base wave of the current.

The armature current flow causes an armature reaction in the motor with the result that the terminal voltage $e_U$ decreases by the amount of the armature reaction drop from the nominal induced electromotive force $e_{OU}$. That is, $$e_U = e_{OU} - x_s Im \cos(\omega r t + \gamma_0) \tag{29}$$

This equation (29) may be transformed as follows:

$$\begin{aligned} e_U = &-\omega r M_F(k_1 E_1)\sin(\omega r t - \delta) \\ &-[k_1 \omega r M_F - k_2 x_s]E_2 \sin \gamma \sin(\omega r t + \delta) \\ &+[k_1 \omega r M_F - k_2 x_s]E_2 \cos \gamma \cos(\omega r t - \delta) \end{aligned} \tag{30}$$

where
$k_1 = I_F/E_3$
$k_2 = Im/E_2$

The second and third terms of the equation (30) may be zero if the following conditions are satisfied:

$$k_1/k_2 = x_s/\omega r M_F \tag{31}$$

The satisfaction of the relation of the equation (31) can be obtained, for example, by controlling the input resistance of the current difference amplifier circuit 33 or 17. If the relation of the equation (31) is satisfied, the terminal voltage $e_U$ becomes as expressed by the following equation:

$$e_U = -\omega r M_F(k_1 \cdot E_1)\sin(\omega r t - \delta) \tag{32}$$

That is, the amplitude of the terminal voltage is determined by the constant exciting current reference $E_1$ but is constant irrespective of the armature current. The phase of the terminal voltage can always be maintained at a predetermined phase difference $\gamma$ ($\gamma = \gamma_0 - \delta$) from the armature current of the motor.

The torque produced in this case can be obtained by the following equation:

$$\tau = (3/2)pM_F(k_1 \cdot E_1)Im \cos \gamma \tag{33}$$

That is, the torque is in proportion to the armature current.

It should be appreciated that the same advantages and effects as those obtained in the previous embodiments can also be obtained in this embodiment of the present invention. It should also be appreciated that the phase difference (power factor angle) γ may be at any rate controlled by the power factor angle reference $E_4$. It should also be appreciated that since the power factor angle δ can be set up the magnitude necessary for stably commutating the frequency converter 31 and yet can vary the magnitude of the torque by controlling itself as clear from the formula (33), the torque (the magnitude of the torque) may be controlled by controlling the power factor angle reference γ in accordance with a predetermined relation.

Figure 13:
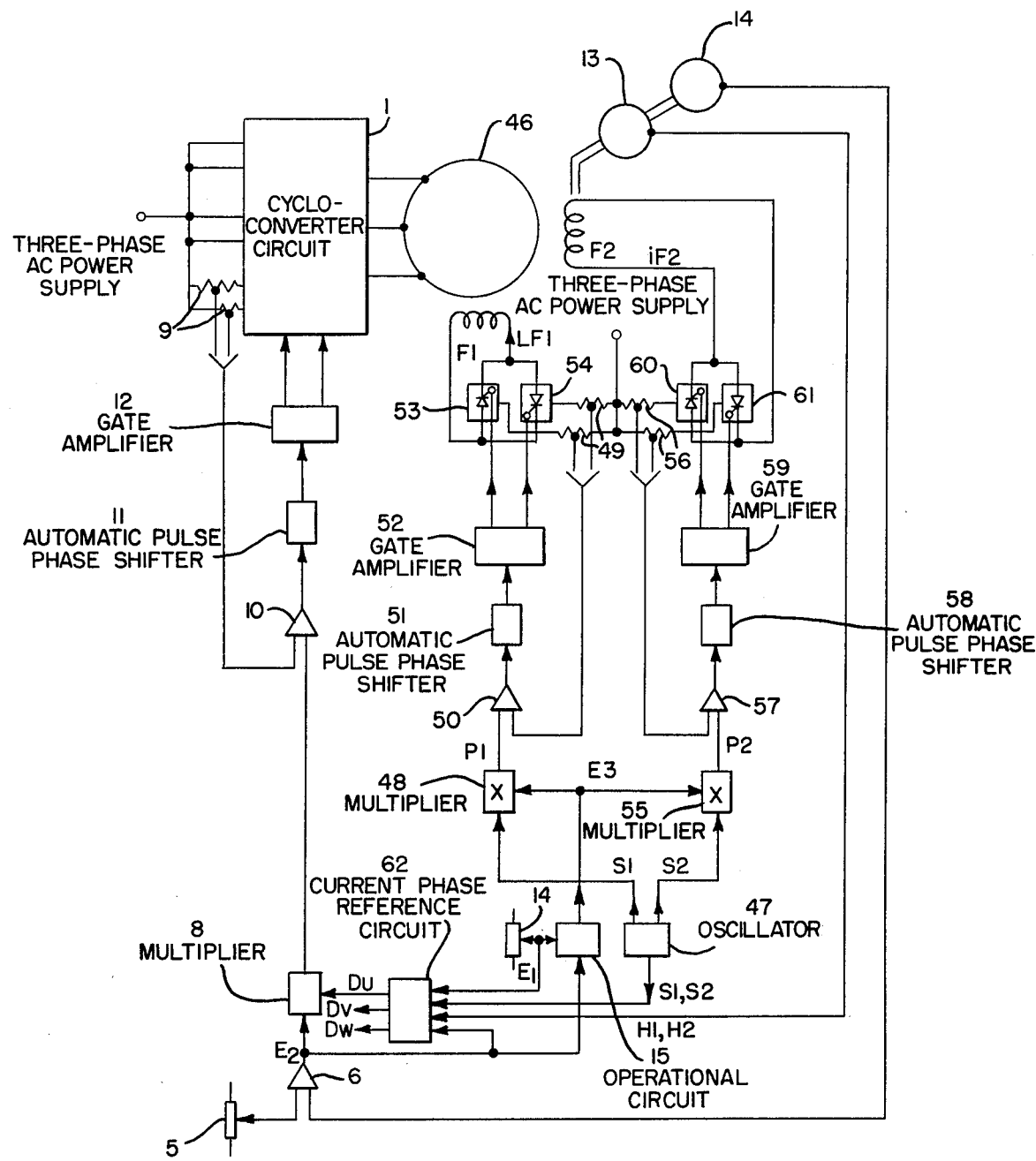
FIG. 13 is a circuit diagram showing the main circuit construction of another embodiment.

FIG. 13 is a circuit diagram showing still another embodiment of the present invention for preventing the current concentration of the frequency converter to the thyristor in the vicinity of zero of the rotational speed.

Initially, the reason that the current concentration takes place in the vicinity of zero of the rotational speed will now be hereinafter described with reference to the example shown in FIG. 4;

If the rotational speed of the frequency converter is not zero, the output current of the converter is instantaneously varying in amplitude in sinusoidal state. That is, the magnitude of the output current changes from the amplitude of the sinusoidal wave to zero. On the other hand, at the junction of the thyristor is generated a heat proportional to the product of the forward voltage drop and passing current. The heat generated at the junction of the thyristor varies at the frequency equal to the output frequency of the frequency converter in magnitude. If the output frequency is relatively high, the varying period of the heat becomes shorter. Therefore, the temperature rise at the thyristor junction is standardized by the thermal capacity of the junction. In this case, the temperature increase becomes the value responsive to the mean value of the generated heat.

However, if the output frequency is low, particularly if it is zero, the frequency converter does not vary in its output current so that the magnitude of the current becomes sometimes within the magnitude equal to the amplitude of the sinusoidal wave. Therefore, in this case, the temperature increase at the thyristor junction is not standardized but is determined by the current of the magnitude of the sinusoidal amplitude value. This fact will now be hereinafter described in greater detail:

If the rotational speed is not zero, the mean value $i_a$ of the output current of the respective thyristor circuits U$p$ to W$n$ is represented by the following equation, where the amplitude value of the armature current is signified by $Im$:

$$i_a = (1/\pi) Im \quad (34)$$

On the other hand, if the rotational speed is zero, this mean value $i_a$ becomes as follows:

$$i_a = Im \quad (35)$$

That is, when the converter is stopped, π times of current flows through the thyristor circuits with the result that it is apprehended that there occurs an overheat of the thyristors. This is called a current concentration phenomenon. The place of the occurrence of the current concentration in the thyristor circuits U$p$ to W$n$ depends upon the relative position relation of the armature and field of the converter. In addition, it is necessary to consider with the current concentration for all the thyristor circuits. Finally, all the thyristor circuits need π times of capacity in this manner. Therefore, they necessitate large type of cycloconverter circuit.

FIG. 13 shows the embodiment of the present invention for preventing such current concentration according to the invention.

In FIG. 13, the parts and components designated by like reference numerals as those shown in FIG. 4 are like parts and components and will not further described hereinafter in more detail. Reference numeral 46 is a synchronous motor which has two field windings $F_1$ and $F_2$ for generating magnetomotive forces crossing to each other perpendicularly, numeral 47 an oscillator for producing two sinusoidal signals $S_1$ and $S_2$ having phase differences of 90 degrees with each other, 48 a multiplier for multiplying the field current reference $E_8$ of the operational circuit 15 by the output signal $S_1$ of the oscillator 47, 49 a current detector for detecting the AC input current of field control thyristor pure bridge circuits 53 and 54, which will be hereinafter referred to as thyristor circuits, 50 a current difference amplifier circuit for amplifying the superimposition of the output signal (field current pattern signal) $P_1$ of the multiplier 48 and the output signal of the current detector 49, 51 an automatic pulse phase shifter for controlling the firing phase of the thyristor circuits 53 and 54 in accordance with the output signal of the current difference amplifier circuit 50, 52 a gate amplifier for producing a gate signal to the thyristor circuits 53 and 54 responsive to the designation of the positive or negative of the field current $i_F$ of the motor, 53 and 54 thyristor circuits for supplying the field current $i_{F_1}$ to the field winding $F_1$ of the motor, 55 a multiplier for multiplying the field current reference $E_8$ by the signal $S_2$ of the oscillator 47, 56 a current detector for detecting the AC input current of the thyristor circuits 60 and 61, 57 a current difference amplifier circuit for amplifying the superimposition of the output signal $P_2$ of the multiplier 55 and the output signal of the current detector 56, 58 an automatic pulse phase shifter for controlling the firing phase of the thyristor circuits 60 and 61 in accordance with the output signal of the current difference amplifier circuit 41, 59 a gate amplifier for producing a gate signal to the thyristor circuit 60 or 61 in response to the designation of positive or negative of the field current $i_{F_2}$ of the motor, 60 and 61 thyristor circuits for supplying the field current $i_{F_2}$ to the field winding $F_2$ of the motor, 62 a current phase reference circuit which receives the position signals $H_1$ and $H_2$ of the position sensor 13, output signals $S_1$ and $S_2$ of the oscillator 31, and constant exciting references $E_1$ and current reference $E_2$ and produces three-phase sinusoidal signal, which will be hereinafter referred to as current phase reference, as will be described in greater detail.

Figure 14:
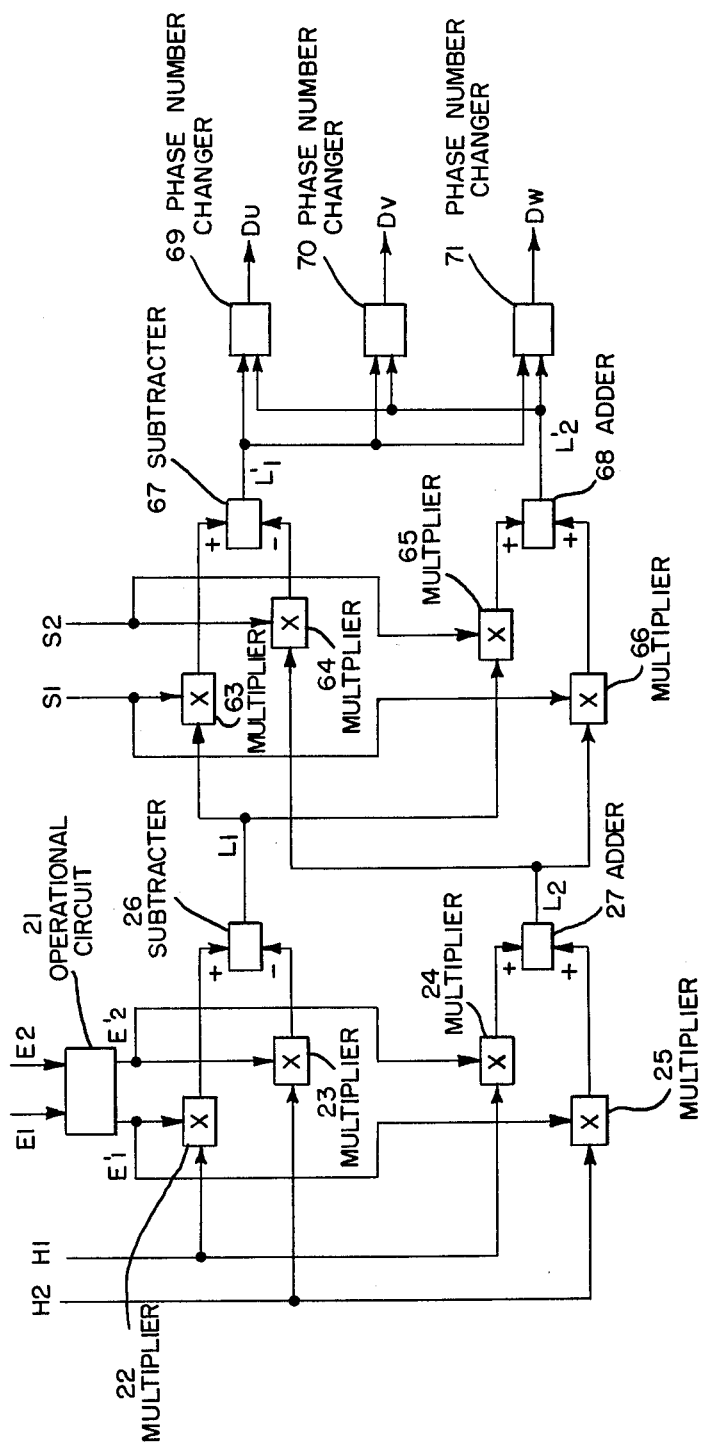
FIG. 14 is a schematic diagram illustrating the current phase reference circuit in the system of FIG. 13.

FIG. 14 is a fragmentary schematic diagram of the current phase reference circuit 62 in the circuit configuration shown in FIG. 13 as still another embodiment of the present invention. In FIG. 14, the parts and components designated by like reference numerals as those shown in FIG. 5 are like parts and components and will not further described in more detail. Reference numerals 63 to 66 illustrate multipliers for multiplying the output signals $S_1$ and $S_2$ of the oscillator 47 by the output signals $L_1$ and $L_2$ of the substracter 26 and adder 27, respectively, 67 a substracter which receives the output signals of the multipliers 63 and 64 in the polarities as shown and and produces their difference, 68 an adder for producing the sum of the output signals of the multipliers 65 and 66, and 69 to 71 phase number changers which add the respective output signals of the subtractor 67 and adder 68 in a predetermined ratio as will be described and produce the three-phase sinusoidal signal.

The operation of the circuit configuration thus constructed will now be hereinafter described. The oscillator 47 produces two sinusoidal output signals $S_1$ and $S_2$ having the phase difference of 90°, wherein since the amplitude of the signals do not signify importance, it is omitted to describe any further.

$$S_1 = \cos(\omega s t + \theta) \qquad (36)$$

$$S_2 = \sin(\omega s t + \theta) \qquad (37)$$

where $\omega s$: signal angular frequency (oscillating frequency)
$\theta$: signal phase at the time $t = 0$ The multipliers 48 and 55 multiply the sinusoidal signals $S_1$ or $S_2$ by the field current reference $E_3$ to produce the signals $P_1$ and $P_2$ having the magnitude proportional to the field current reference $E_2$ as expressed by the following formulae in phase with the sinusoidal signals $S_1$ and $S_2$:

$$P_1 = E_3 \cos(\omega s t + \theta) \qquad (38)$$

$$P_2 = E_3 \sin(\omega s t + \theta) \qquad (39)$$

The signals $P_1$ and $P_2$ become the field current pattern signals for determining the magnitude and phase of the field currents $i_{F_1}$ and $i_{F_2}$. This field current pattern signal $P_1$ is compared with the output signal of the current detector 49 by the current difference amplifier circuit 50, and the difference signal is applied to the automatic pulse phase shifter 51, which controls the firing phase in response to the phase difference signal to apply a gate signal to the thyristor circuit 53 or 54 from the gate amplifier 52. The application of the gate signal to the thyristor circuits 53 or 54 is determined by the positive or negative designation of the field current $i_{F_1}$ of the motor. Then, the thyristor circuits 53 and 54 are controlled similarly to the current control of the stationary Leonard's device known as matters of common knowledge possible to control the current flow in forward and reverse directions. As a result, the field current $i_{F_1}$ is controlled in phase with the field current pattern signal $P_1$ and the magnitude of the current is proportional to the field current reference $E_3$. Similarly, the field current $i_{F_2}$ of the field winding $F_2$ is controlled in phase with the field current pattern signal $P_2$.

In this way thus controlled, the field currents $i_{F_1}$ and $i_{F_2}$ become the current varying in sinusoidal manner as expressed by the following equations:

$$i_{F_1} = K P_1 = I_F \cos(\omega s t + \theta) \qquad (40)$$

$$i_{F_2} = K P_2 = I_F \sin(\omega s t + \theta) \qquad (41)$$

where:
$K$: a proportional constant
$I_F$: amplitude of field current

Considering now the voltage induced in the armature windings U, V and W at this time, field currents $i_{F_1}$ and $i_{F_2}$ produces magnetic flux crossing the armature windings, and the nominal induced electromotive force eou as expressed in the following formula is induced in the armature winding U phase with the chage of the number of magnetic flux crossing the armature windings. The V and W phase voltage differs from the U phase signal only in phase of respective 120°, so they will now be hereinafter described any further.

$$eou + - (\omega s + \omega r) M \cdot I_F \sin[(\omega s + \omega r)t + \theta + \phi_1] \qquad (42)$$

where $M$: maximum mutual inductance between field windings $F_1$ and $F_2$ and armature winding
$\phi_1$: an electric angle between the field winding $F_1$ and the armature winding U at the time $t = 0$ On the other hand, the armature current is so controlled as in the following manner: there are at first obtained signals $H_1$ and $H_2$ as indicated by the equations (4) and (5) from the position senser 13.

The current phase reference circuit 62 receives the signals $H_1$ and $H_2$, constant exciting current reference $E_1$ and output signal $E_2$ of the spaced difference amplifier circuit 6, calculates as expressed in the equations (8) and (9), and produces the signal $L_1$ and $L_2$.

Then, the circuit produces the signals $L_1'$ and $L_2'$ as expressed by the following equations from the signals $L_1$ and $L_2$, and $S_1$ and $S_2$. That is, the multipliers 63 and 64 multiply the signals $S_1$ and $S_2$ by the signals $L_1$ and $L_2$, respectively, and the substractor 67 substracts these two signals thus obtained to produce the following signal $L_1'$:

$$L_1' = \cos[(\omega s + \omega r_1)t + \theta + \phi_2 - \delta] \qquad (43)$$

Similarly, the multipliers 65 and 66 multiply the signals $S_2$ and $S_1$ by the signals $L_1$ and $L_2$, respectively, and the adder 68 adds the two signals thus obtained to produce the signal $L_2'$ as expressed in the following formula:

$$L_s' = \sin[(\omega s + \omega r)t + \theta + 100_2 + \delta] \qquad (44)$$

These signals $L_1'$ and $L_2'$ are introduced to the phase number changers 69 to 71 which operate to calculate as expressed in the following equations to produce the following three signals (current phase references ) $Du$, $Dv$ and $Dw$:

$$Du = L_2' = -\sin[(\omega s + \omega r)t + \theta + \phi_2 + \delta] \qquad (45)$$

$$Dv = (\sqrt{3}/2) L_1' + \tfrac{1}{2} L_2' = -\sin[(\omega s + \omega r_1)t + \theta + \phi_2 - \delta - 120°] \qquad (46)$$

$$Dw = (3/2) L_1' - \tfrac{1}{2} L_2' = -\sin[(\omega s + \omega r)t + \theta + \phi_2 + \delta + 120°] \qquad (47)$$

The current phase references Du to Dw are sinusoidal signals having equal frequency to the voltage eo and phase differences of 120° to each other.

The current phase reference Du thus obtained is multiplied by the output signal $E_2$ of the speed difference amplifier circuit 6 by the multiplier 8 to produce the armature current pattern signal so as to control the firing phase of the cycloconverter 1 similarly to the previous embodiment in accordance with the pattern signal thus produced. As a result, the current phase references Du to Dw as expressed in the equations (45) to (47) differs only in the angular frequency from the current phase references as indicated in the formulae (10) to (12). Therefore, similarly to the embodiment shown in FIG. 4, the magnitude of the terminal voltage can be maintained constant determined by the constant exciting current reference $E_1$ and the armature current can be in phase with the terminal voltage.

In this case, of course, the terminal voltage and armature current have the angular frequency of $\omega s + \omega r$ and also have the frequency of the signal frequency of the oscillator 47 even if the rotational speed is zero ($\omega r = 0$).

Therefore, the embodiment of the present invention shown in FIG. 13 can compensate the armature reaction and yet can prevent the current concentration. That is, the frequencies of the armature current and voltage have the frequency of the output signal frequency component $\omega s$ of the oscillator 15 even if the rotational speed is zero ($\omega r = 0$). Accordingly, in consideration with the thermal time constant of the thyristors which form the cycloconverter 1 with the oscillating frequency of the oscillator, the current concentration can be prevented by setting up the frequency of the extent (for example 1 to 2Hz) which does not occur the current concentration (overheating of thyristors).

The field control thyristor circuit needs 5 to 10% of the capacity of the cycloconverter 1, but since the current concentration can be prevented, the capacity of the thyristors of the cycloconverter 1 can be reduced to approximately ⅓. In addition, the capacity of the thryristor circuit can be greatly reduced as a whole.

In the embodiment shown in FIG. 13, the frequency of the output signal of the oscillator 15 is made always constant, but the current concentration cannot be taken place because even if the frequency of the oscillator 15 is zero if the rotational speed of the motor 2 is not in the neighborhood of zero, the frequency of the armature current is ($\omega s + \omega r/2\omega$). In such case, it would be desirable to set the frequency $\omega s$ of the oscillator 15 in the vicinity of zero in order to reduce the power flowing into the field control thyristor circuit. This can be achieved by controlling steppedly or continuously the frequency of the oscillator 15 to zero in accordance with the increase of the rotational speed from zero. This can be easily done by adopting the output signal of the tachometer generator.

It should be appreciated that although the previous embodiments have represented the case of the sum of frequency $\omega s$ of the field current and induced voltage angular frequency $\omega r$ in term of the frequency of the armature current, the same can be performed in case of difference therebetween. That is, if the output signals $S_1$ and $S_2$ of the oscillator are replaced with each other, the phase of the field current becomes inverse so that the frequency of the armature current becomes the difference between $\omega s$ and $\omega r$. It should also be understood that since the frequency of the armature current can be controlled by the oscillator even in this case, similarly the current concentration may be prevented.

It should be understood from the foregoing description that since the magnitude of the armature terminal voltage can be maintained constant regardless of the magnitude of the armature current and the phase difference between the terminal voltage and the armature current can be set to a predetermined phase according to the present invention, the decrease of the power factor and increase of the terminal voltage due to the load change can be prevented without providing the compensating windings, that is, can compensate the armature reaction under the control so as to reduce the capacity of the power converter and AC motor.

It should also be understood that since the field windings alternatively excite to generate the rotary magnetic force so as to induce the AC voltage in the armature windings even if the rotational speed is zero and to supply the armature current in a predetermined phase with respect to the induced voltage according to the present invention, the torque is produced so as to rotate it and to prevent the current concentration.

What is claimed is:

1. A control system for commutatorless motor comprising:
    a. a synchronous motor having polyphase armature winding and a field winding,
    b. a frequency converter for supplying AC current of variable frequency to the armature winding of said synchronous motor,
    c. a position senser for detecting the position signal based on the rotational position of said synchronous motor,
    d. a voltage setup means for producing a constant exciting current reference determined in magnitude of the terminal voltage of said synchronous motor,
    e. first operational means for obtaining the magnitude of a nominal induced electromotive force of the vector sum of the armature reaction drop and the terminal voltage of said synchronous motor based on the signal proportional to the armature current and said constant exciting current reference produced from said voltage setup means,
    f. second operational means for obtaining the phase difference between the nominal induced electromotive force obtained by said first operational means and the terminal voltage of said synchronous motor,
    g. field control means for controlling the field current supplied to the field winding of said synchronous motor responsive to the magnitude of the nominal induced electromotive force produced by said voltage setup means,
    h. current phase reference means for producing a current phase reference leading the position signal of said position senser by the phase difference obtained by said second operational means, and
    i. current control means for controlling the firing phase of said frequency converter based on the current phase reference and current reference.

2. A control system for commutatorless motor according to claim 1, wherein said first operational means obtains a nominal induced electromotive force with said current reference and said constant exciting current reference.

3. A control system for commutatorless motor according to claim 1, wherein said position senser is provided in phase with the nominal induced electromotive force in the phase of the position signal thereof.

4. A control system for commutatorless motor comprising:
    a. a synchronous motor having polyphase armature winding and a field winding,
    b. a rectifying means for converting AC to DC,
    b'. an inverter means for converting the DC output of said rectifying means to AC to apply it to the armature winding of said synchronous motor,
    c. a position senser or detecting the position signal based on the rotational position of said synchronous motor,
    d. a voltage setup means for producing a constant exciting current reference determined in magnitude of the terminal voltage of said synchronous motor,
    e. first operational means for obtaining the magnitude of a nominal induced electromotive force of the vector sum of the armature reaction drop and the terminal voltage of said synchronous motor based on the signal proportional to the armature current and said constant exciting current reference produced from said voltage setup means, f. second operational means for obtaining the phase difference between the nominal induced electromotive force obtained by said first operational means and the terminal voltage of said synchronous motor, g. field control means for controlling the field current supplied to the field winding of said synchronous motor responsive to the magnitude of the nominal induced electromotive force produced by said voltage setup means, h. current phase reference means for producing a current phase reference leading the position signal of said position senser by the phase difference obtained by said second operational means, and i. current control means for controlling the firing phase of said frequency converter based on the current phase reference and current reference.

5. A control system for commutatorless motor comprising:

a. a synchronous motor having polyphase armature winding and a field winding, b. a rectifying means for converting AC to DC, b'. an inverter means for converting the DC output of said rectifying means to AC to apply it to the armature winding of said synchronous motor, c. a position senser for detecting the position signal based on the rotational position of said synchronous motor, d. a voltage setup means for producing a constant exciting current reference determined in magnitude of the terminal voltage of said synchronous motor, e. first operational means for obtaining the magnitude of a nominal induced electromotive force of the vector sum of the armature reaction drop and the terminal voltage of said synchronous motor based on the signal proportional to the armature current and said constant exciting current reference produced from said voltage setup means, f. second operational means for obtaining the phase difference between the nominal induced electromotive force obtained by said first operational means and the terminal voltage of said synchronous motor, g. field control means for controlling the field current supplied to the field winding of said synchronous motor responsive to the magnitude of the nominal induced electromotive force produced by said voltage setup means, h. a power factor angle setup means for generating a power factor angle reference for instructing the power factor angle, h'. a current phase reference means for producing a current phase reference leading the position signal of said position senser by the phase difference of the sum of the phase difference obtained by said second operational means and said power factor angle reference, i. current control means for controlling the firing phase of said frequency converter based on the current phase reference and current reference.

6. A control system for commutatorless motor comprising:

a. a synchronous motor having polyphase armature winding and a polyphase field winding, b. a frequency converter for supplying AC current of variable frequency to the armature winding of said synchronous motor, c. a position senser for detecting the position signal based on the rotational position of said synchronous motor, d. a voltage setup means for producing a constant exciting current reference determined in magnitude of the terminal voltage of said synchronous motor, e. first operational means for obtaining the magnitude of a nominal induced electromotive force of the vector sum of the armature reaction drop and the terminal voltage of said synchronous motor based on the signal proportional to the armature current and said constant exciting current reference produced from said voltage setup means, f. second operational means for obtaining the phase difference between the nominal induced electromotive force obtained by the first operational means and the terminal voltage of said synchronous motor, g. current phase reference means for producing a current phase reference leading the position signal of said position senser by the phase difference obtained by said second operational means, h. current control means for controlling the firing phase of said frequency converter based on the current phase reference and current reference, i. an oscillator for oscillating polyphase AC signal having the same number of phase as that of the field winding of said synchronous motor j. modulating means for modulating the polyphase AC signal by the nominal induced electromotive force obtained by said first operational means, and k. field control means for AC exciting the field winding of said synchronous motor based on the modulating signal of said modulating means.

7. A control system for commutatorless motor according to claim 6, wherein said oscillator is oscillator only at starting time.

8. A control system for commutatorless motor according to claim 6, wherein said oscillator is decreased in the output frequency with the increase of the rotational speed of said synchronous motor.

* * * * *